Jan. 23, 1934.    L. R. QUARLES    1,944,756
REGULATING SYSTEM
Filed June 10, 1932

WITNESSES:
P. J. Fitzgerald
C. J. Bryant

INVENTOR
Lawrence R. Quarles.
BY Franklin E. Hardy
ATTORNEY

Patented Jan. 23, 1934

1,944,756

UNITED STATES PATENT OFFICE 1,944,756

REGULATING SYSTEM

Lawrence R. Quarles, Wilkinsburg, Pa., assignor to Westinghouse Electric & Manufacturing Company, East Pittsburgh, Pa., a corporation of Pennsylvania Application June 10, 1932. Serial No. 616,482

6 Claims. (Cl. 171—312)

My invention relates to regulating systems and has particular relation to systems for regulating the speed of electric motors of the direct-current type.

An object of my invention is to provide a speed regulating system for direct-current motors in which none of the devices utilized have mechanically moving parts.

Another object of my invention is to provide a system of the type described which possesses extremely high sensitivity and regulatory precision.

A further object of my invention is to provide a speed regulating system for direct-current motors which are energized through electronic-tube rectifying means from an alternating current source of power which is exceedingly simple and relatively inexpensive.

In practicing my invention, I dispose intermediate the motor armature winding and the source of alternating current power from which it is energized, electronic tubes of the grid-controlled gas-filled type, preferably in a manner to effect full-wave rectification. The conductivity of these tubes is controlled, through means preferably comprising a phase-shifting bridge circuit which impresses upon the tube-grid elements a wave of control voltage, by a superimposed direct-current potential, the magnitude of which varies with the speed of the motor. This controlling potential may be the armature winding voltage of the regulated motor, which will be substantially proportional to the motor speed, or it may be supplied by a separate pilot generator suitably driven from the motor shaft.

My invention will best be understood from the following description of specific embodiments thereof, when taken in conjunction with the accompanying drawing, in which.

Figure 3:
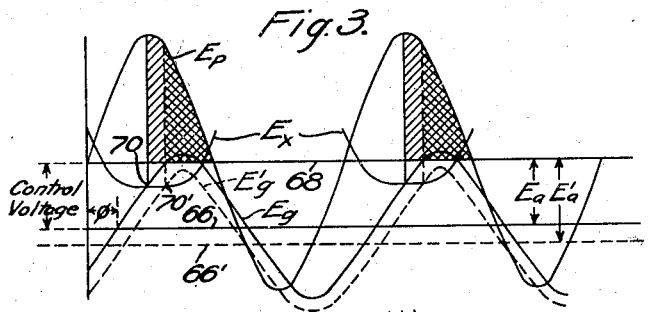
Figure 4:
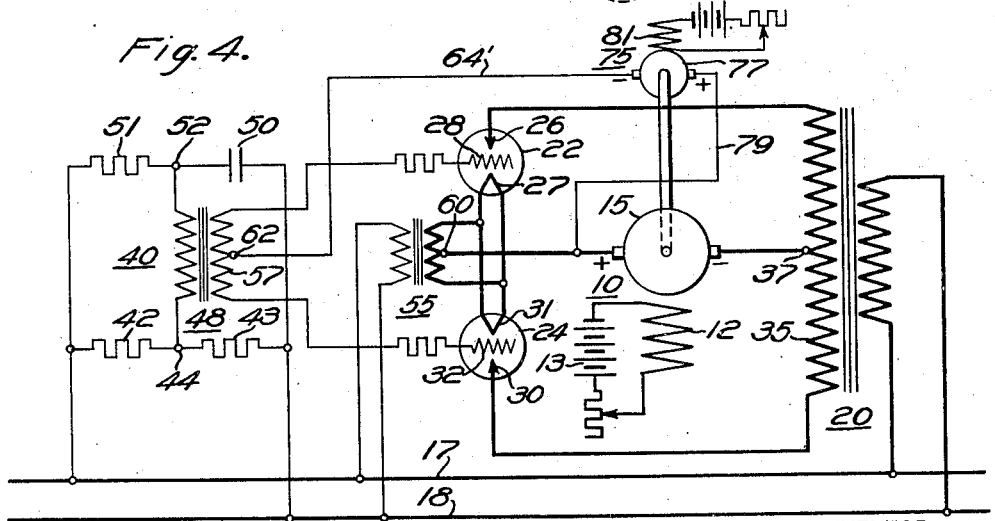

Fig. 3 is a diagram showing curves illustrating the manner in which the electronic tubes utilized by the regulating system of my invention function to rectify and control the magnitude of energizing current supplied from an alternating-current source to the armature winding of the motor the speed of which is being regulated; and, Fig. 4 is a diagrammatic view of apparatus and circuits arranged in accordance with a second embodiment of my invention, in which a pilot generator is utilized to supply the speed-responsive controlling potential.

Figure 1:
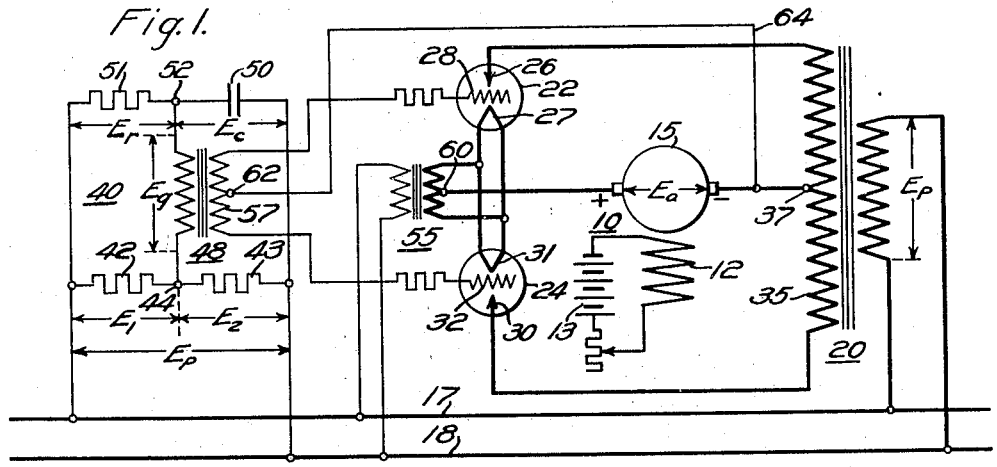
Figure 1 is a diagrammatic view of apparatus and circuits illustrating the system of my invention applied to control the speed of a direct-current motor in which the motor-armature voltage is utilized as the regulating medium.

Referring to the drawing, and particularly to Fig. 1 thereof, the direct-current motor the speed of which is to be regulated is designated generally at 10. This motor comprises a field winding 12, that is constantly energized from some suitable source of direct-current potential, shown as a battery 13, and an armature winding 15 that is energized by direct current from the rectifying means comprising electronic tubes 22 and 24, which tubes are supplied from a source of alternating-current potential, designated by circuit conductors 17 and 18, through a transformer 20.

The electronic tubes 22 and 24 are preferably of the well-known grid-controlled gas-filled variety. As shown, tube 22, for example, comprises two major elements, an anode or plate 26, an electrically heated cathode 27, and one minor or control-grid element 28. Tube 24 will be seen to comprise similarly disposed elements 30, 31 and 32, respectively.

When disposed in the manner shown, tubes 22 and 24 effect full-wave rectification of the alternating-current which energizes motor armature winding 15, it being observed that each of the tubes is disposed in a circuit that includes, as an energizing source, the portion of the secondary winding 35 of transformer 20 on either side of a mid-tap connection 37.

The tubes possess the well-known characteristic of passing current between the major elements in one direction only, from anode to cathode, so that when energized from an alternating-current source, current passage can take place only during the positive half-cycle. Thus, when connected as in the system of Fig. 1, tube 22 passes current through motor armature winding 15 during one half of the alternating-current cycle, while tube 24 similarly passes current during the other half of the cycle.

In a tube of the type under consideration, the portion of this positive half-cycle during which conduction takes place, and hence the effective current passed, may be regulated by suitably modifying the control potential impressed upon the grid element of the tube. The system of my invention utilizes a special method of control potential modification which is directly responsive to changes in motor speed, to thereby effect the speed regulation desired.

In order that a grid-controlled gas-filled tube conduct current through its major-element circuit, it is necessary that the control-grid element be maintained at a potential in excess of some given critical value. Such a series of minimum or critical values of grid voltage is represented in Fig. 3 by curve $E_x$, which curve is related to the wave of voltage $E_p$ impressed upon the major-element circuit of the tube in the manner shown.

Curve $E_x$ will be recognized as applying to a hot-cathode tube of the mercury-filled type, which tube behaves in the manner that if a negative bias be maintained on the grid in excess of a given series of values throughout the cycle, no current conduction between the major elements can take place. However, if this negative grid bias voltage falls below the critical value indicated by curve $E_x$, conduction from that point during the remainder of the positive half-cycle will take place. Consequently, when the position of a wave of grid voltage is that represented by $E_g$ in Fig. 3, current conduction from anode to cathode of the tube will result during the shaded portion of the positive half-cycle. As will be apparent, the starting point of such conduction may be changed by shifting the point of intersection of the control potential curve $E_g$ with the critical voltage curve $E_x$.

The regulating system of my invention utilizes, as before mentioned, a direct-current control voltage the magnitude of which varies with the speed of the motor being regulated, for the purpose of effecting this shift in intersection of the control and critical voltage curves.

Figure 2:
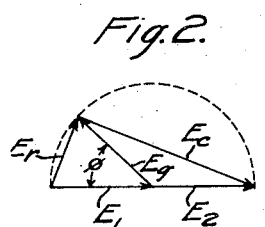
Fig. 2 is a diagram of vectors illustrating the action of the phase-shifting bridge circuit utilized by the system shown in Fig. 1.

To take greatest advantage of the electronic-tube characteristics, a phase-shifting bridge circuit 40 is utilized intermediate the alternating-current power source and the control elements of the tubes. Bridge circuit 40 is directly energized from power source conductors 17 and 18, and serves to shift the phase-position of the control voltage impressed upon the grid elements of tubes 22 and 24 by some suitable angular value, such as is indicated in Figs. 2 and 3 by angle $\theta$. As shown, the circuit comprises a pair of series-connected resistors 42 and 43, the common point 44 of which is joined with one end of the primary winding of a grid-coupling transformer 48, and a capacitor 50, series-connected with a third resistor 51, the common point 52 of which connection is joined with the other end of the primary winding of transformer 48.

The alternating-current voltage acting upon resistor 51 and capacitor 50 in series produces, in these elements potential drops $E_r$ and $E_c$, having some such phase relation as indicated in Fig. 2. In this figure, vectors $E_1$ and $E_2$ indicate the voltages acting in series-connected resistors 42 and 43, while vector $E_g$ designates the potential acting between points 44 and 52 of the bridge circuit, which potential is impressed upon the grid elements of tubes 22 and 24 by means of coupling transformer 48. It will be seen that the control voltage thus impressed upon the tube grid elements is displaced by angle $\theta$ from the main power voltage $E_p$, acting between circuit conductors 17 and 18, which voltage is impressed through transformer 20 upon the major elements of tubes 22 and 24.

In the system of Fig. 1, the armature voltage of the regulated motor constitutes the tube-conductivity controlling potential. It will be recognized that for constant excitation and load conditions on the motor, the armature voltage is a direct measure of motor speed, and that even when the loading of the motor changes, it still provides a comparatively accurate speed index as long as the motor field current is held constant.

Thus, in the system of Fig. 1, the armature winding 15 of the regulated motor 10 is connected in series relation with the cathode elements 27 and 31 of the electronic tubes, which elements are shown as being supplied with heating current through a transformer 55, and the grid elements 28 and 32 of the tubes, which are respectively connected with the two ends of secondary winding 57 of coupling transformer 48. In the particular connection shown, the positive-polarity connection for the rectified voltage which energizes motor armature winding 15 comprises a conductor directly joined with a mid-tap connection 60 of cathode heating transformer 55, while the negative-polarity connection for this voltage comprises mid-tap connection 37 of the main supply transformer 20. Instead of joining the mid-tap connection 62 of grid transformer 48 directly with connection 60 of cathode heating transformer 55, I interpose the motor armature winding 15 intermediate these two points, such a connection being established by joining grid-transformer conductor 64 with the negative terminal of motor armature 15.

As a result of this connection, the grid control voltage $E_g$ has superimposed thereon the direct-current motor armature voltage, thereby shifting the neutral axis 66 of wave $E_g$ below the neutral axis 68 of armature supply voltage wave $E_p$ in the manner shown in Fig. 3. It will be apparent that the magnitude of this neutral axis displacement is a direct function of the terminal voltage of motor armature 15, which, as has been seen, is a measure of the motor speed. This shifting, combined with a proper phase displacement between waves $E_p$ and $E_g$ of the general order indicated by $\theta$ in Fig. 3, causes deviations in motor speed from a desired value to automatically effect corrective changes in the motor energizing current.

In the operation of the speed regulating system of my invention, when the speed of the motor 10 is at its desired value, the armature voltage will have some value as indicated by $E_a$ in Fig. 3, in which case the grid voltage curve $E_g$ intersects the critical voltage curve $E_x$ at point 70, thereby causing each of the tubes 22 and 24 to become conductive from that point on during each positive half-cycle of power voltage $E_p$ impressed on the anode element of this tube. As has been mentioned, tube 22 passes current during one half of the alternating-current cycle, while tube 24 similarly passes current during the other half of the cycle. The resulting rectified current which energizes the motor armature thus has an effective value of a given magnitude which, under the particular conditions of motor excitation and loading, is sufficient to maintain the motor speed at the desired value.

In the event that the motor speeds up, due, for example, to a reduction of the load, the armature voltage proportionately increases to some value which may be of the order indicated by $E_a'$ in Fig. 3. This shifts the neutral axis of the grid voltage wave from 66 to 66', causing wave $E_g$ to move to position $E_g'$, which in turn, moves the intersection point of this wave with critical voltage curve $E_x$ nearer the end of the positive half-cycle of power voltage $E_p$ or to position 70'. The starting point of current conduction during each positive half-cycle is accordingly delayed, and the effective energizing current supplied to the motor armature is correspondingly reduced, the effect of such reduction being to decrease the motor speed. The excess speed condition assumed is thus automatically corrected.

In a similar manner, it will be seen that should the motor slow down, the armature voltage will decrease thereby bringing the axes of the voltage waves $E_g$ and $E_p$ closer together and causing wave $E_g$ to intersect curve $E_x$ earlier in each positive half-cycle. This increases the effective current supplied to the motor armature which acts to again raise the motor speed back to the desired value.

It will be apparent to those skilled in the art that the system which I have just described is readily applicable to motors having a wide variety of voltage ratings which are supplied with armature-energizing current through electronic tubes, since the magnitude of normal-speed armature voltage $E_a$ of the regulated motor may be readily matched by adjusting the ratio of grid-supply transformer 48 to determine the magnitude of control voltage wave $E_g$ and adjusting the phase shifting characteristics of bridge circuit 40 to the point of proper coordination with the critical voltage characteristics of the tubes.

The critical voltage curve $E_x$ of Fig. 3 applies, as has been mentioned, to a grid-controlled tube of the mercury-filled type. As already pointed out, other equivalent types of tubes may also be successfully utilized in the system of my invention, as for example, grid-controlled tubes of the gas-filled hot-cathode type as well as of the cold-cathode type which are equally well known. The critical voltage characteristics of this last-named type of tube differ somewhat from that given by curve $E_x$ of Fig. 3, however the effect of shifting the axis of the grid potential curve $E_g$ with respect to the axis of the main power voltage curve $E_p$, is exactly comparable in these situations as in the one explained, although the exact values of displacement need, of course, to be somewhat modified from those which apply to the mercury-tube characteristic illustrated. It should be noted, therefore, that the system of my invention may utilize grid-controlled tubes of a wide variety of types.

The system of my invention shown and described in connection with Fig. 1 is sufficiently accurate in its regulatory precision for the majority of automatic motor speed control applications. The source of slight inaccuracy to which it is subjected results from the fact that the motor armature voltage, which is utilized as the regulating medium, differs slightly from the speed-responsive counter-electromotive force generated in the armature windings, due to the effects of winding resistance drop and armature reaction. Thus, even though the motor field winding current is maintained constant as the loading of the motor changes, the armature voltage will not be an absolutely accurate index of speed because of the varying magnitudes of winding resistance drop and armature reaction, which quantities constitute an appreciable though relatively small percentage of the voltage appearing at the armature terminals.

For situations in which unusually high regulatory precision is required, the modification of my invention illustrated in Fig. 4 will be found to be especially suitable. The system shown in Fig. 4 will be seen to be identical with that of Fig. 1, with the exception that a pilot generator 75, mechanically coupled with the regulated motor 10, is utilized to supply the regulating potential in place of the regulated motor armature voltage.

The armature winding 77 of generator 75 is connected intermediate the grid supply and cathode heating transformers 48 and 55 in the same manner as is armature winding 15 in the system of Fig. 1. Thus, in Fig. 4, the mid-tap connections 62 and 60 of the two transformers named, are connected together through a circuit which includes conductor 64', the pilot generator armature 77 and conductor 79.

It will be apparent that for a constant value of exciting current supplied to field winding 81 of the pilot generator, the voltage generated in armature winding 77 thereof provides an index to the speed of regulated motor 10, from which the generator is driven, which is exceedingly accurate, particularly since the loading of this pilot generator is exceedingly small in an application of the type under consideration. This combination makes the operation of the speed regulating system entirely independent of changes in the excitation and loading of the motor being controlled, which feature is one of importance in certain special types of applications.

It will be recognized that the supplying of controlling voltage from the pilot generator in the system of Fig. 4, instead of directly from the armature winding of the regulating motor, in no way changes the manner of operation of the complete regulating system, it serving only to increase its precision and accuracy. Such being the case, further operative description of the system of Fig. 4 is deemed unnecessary.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. A speed-regulating system for a direct-current motor having an armature winding and a field winding comprising, in combination, means for energizing said field winding, a source of alternating-current power, current-rectifying and controlling means comprising a gas-filled electronic tube having a control-grid element and anode and cathode elements connected intermediate the said source of power and the motor-armature winding, means for influencing said control-grid element by a wave of control voltage the phase position of which is displaced from that of the power source voltage, and means for superimposing upon said control-voltage wave a direct-current potential the magnitude of which varies with the speed of said motor.

2. A speed-regulating system for a direct-current motor having an armature winding and a field winding comprising, in combination, means for energizing said field winding, a source of alternating-current power, current-rectifying and controlling means comprising a gas-filled electronic tube having a control-grid element and anode and cathode elements connected intermediate the said source of power and the motor-armature winding, means for influencing said control-grid element by a wave of control voltage of constant amplitude and of fixed phase relation with respect to the power-source voltage wave, and means for superimposing upon said control-voltage wave a direct-current potential the magnitude of which varies with the speed of said motor.

3. A speed-regulating system for a direct-current motor having an armature winding and a field winding comprising, in combination, means for energizing said field winding, a source of alternating-current power, current-rectifying and controlling means comprising a gas-filled electronic tube having a control-grid element and anode and cathode elements connected intermediate the said source of power and the motor-armature winding, means, comprising a phase-shifting bridge circuit, for influencing said control-grid element by a wave of control voltage the phase position of which is displaced from that of the power-source voltage, and means for modifying said control-voltage wave by a direct-current potential the magnitude of which is proportional to the speed of said motor.

4. A speed-regulating system for a direct-current motor having an armature winding and a field winding comprising, in combination, means for energizing said field winding, a source of alternating-current power, current-rectifying and controlling means comprising a gas-filled electronic tube having a grid element and anode and cathode elements connected intermediate the said source of power and the motor-armature winding, means for influencing said grid element by a wave of control voltage of constant amplitude and of fixed phase relation with respect to the power-source voltage wave, and means for superimposing upon said control-voltage wave the terminal voltage of said motor armature winding.

5. The combination of a dynamo-electric machine having an armature winding and a field winding, means for energizing said field winding, a source of alternating-current power, a circuit connecting said armature winding with said source of power, a gas-filled electronic tube having anode and cathode elements disposed in said circuit and a control-grid element, means for impressing upon said control-grid element a wave of control voltage the phase position of which bears a fixed relation to that of the power-source voltage, and means for superimposing upon said control-voltage wave a direct-current potential the magnitude of which varies with the speed of said motor.

6. In combination with a direct-current motor having an armature winding and a field winding, means for supplying to one of said windings a unidirectional energizing current of substantially constant magnitude, a source of alternating-current power, current-rectifying and controlling means comprising a gas-filled electronic tube having a grid element and anode and cathode elements connected intermediate the said source of power and the other of said motor windings, means for influencing said grid element by a wave of control voltage of fixed phase relation with respect to the power-source voltage wave, and means for superimposing upon said control-voltage wave a direct-current potential the magnitude of which varies with the speed of said motor.

LAWRENCE R. QUARLES.